(12) United States Patent
Smith et al.

(10) Patent No.: US 6,922,790 B2
(45) Date of Patent: Jul. 26, 2005

(54) THREE WIRE COMMUNICATION PROTOCOL

(75) Inventors: Robert B. Smith, Loveland, CO (US); Gary E. Long, Loveland, CO (US)

(73) Assignee: Remote Switch Systems, Inc., Loveland, CO (US)

( * ) Notice: Subject to any disclaimer, the term of this patent is extended or adjusted under 35 U.S.C. 154(b) by 545 days.

(21) Appl. No.: 10/205,679

(22) Filed: Jul. 25, 2002

(65) Prior Publication Data

US 2004/0019816 A1 Jan. 29, 2004

(51) Int. Cl.[7] ............................. G06F 1/04; G06F 13/42
(52) U.S. Cl. ....................... 713/600; 710/105; 710/110
(58) Field of Search .................................. 713/400, 500, 713/600; 710/33, 36, 105, 106, 110

(56) References Cited

U.S. PATENT DOCUMENTS

| | | | | |
|---|---|---|---|---|
| 4,785,396 A | * | 11/1988 | Murphy et al. | 710/106 |
| 5,653,906 A | * | 8/1997 | Fowler et al. | 219/716 |
| 5,878,234 A | * | 3/1999 | Dutkiewicz et al. | 710/110 |
| 6,119,175 A | * | 9/2000 | Hakkarainen et al. | 710/22 |

* cited by examiner

*Primary Examiner*—Dennis M. Butler
(74) *Attorney, Agent, or Firm*—Cochran Freund & Young LLC

(57) ABSTRACT

Disclosed is a serial communications protocol for connecting a master and a plurality of slaves using three communication lines. The protocol establishes a method for communication between the master and any slave. Any device on the communication bus may initiate the communication. A method of arbitrating any bus collisions is also given.

3 Claims, 5 Drawing Sheets

THREE WIRE COMMUNICATION PROTOCOL

BACKGROUND OF THE INVENTION a. Field of the Invention

The present invention pertains generally to serial communications and specifically to three wire handshaking and data transfer between multiple devices.

b. Description of the Background

Communication between multiple independent electronic devices is typically needed for many different applications. For example, communications between a controller device and one or more slave devices enables a system designer to split the functions of the entire system into manageable parts. These parts may be independent and individually replaceable. In addition, the use of one controller and multiple identical slaves may reduce the cost of the slave units by taking advantage of economies of scale.

Several communications protocols already exist, including the Inter-Integrated Circuit ('I2C') protocol developed by Philips. One of the limitations of the I2C protocol is that a slave cannot initiate communications with the master. However, the master may request information from a slave. Further, the cable length between devices may be an issue with the I2C protocol.

It would therefore be advantageous to provide a communication protocol that allows two way communication between a large number of devices. It would be further advantageous to provide a protocol that may be implemented over long distances.

SUMMARY OF THE INVENTION

The present invention overcomes the disadvantages and limitations of the prior art by providing a serial communications protocol that allows a master to communicate with a plurality of slaves wherein either a master or a slave may initiate communication. Three communication lines are provided: a clock line that is controlled by a master, an acknowledge line that is controllable by all slaves, and a data line that is controllable by both masters and slaves. A simple method of arbitrating the bus is also provided wherein any bus collisions are easily prioritized.

The present invention may therefore comprise a communications protocol for the communication of data between at least one master and at least one slave comprising: a data line, the data line being in communication between the master and the slave, the data line being in a normally high state and further being pulled low by either the master or the slave; a clock line, the clock line being in communication between the master and the slave, the clock line being in a normally high state and further being pulled low by the master; an acknowledge line, the acknowledge line being in communication between the master and the slave, the acknowledge line being in a normally high state and further being pulled low by the slave; a neutral state, the neutral state being such that the data line and the clock line are high and the acknowledge line is low; a start signal, the start signal being such that the data line is pulled low while the clock line is high, the start signal being generated by either the master or the slave; a stop signal, the stop signal being such that the data line is allowed to change from low to high while the clock signal is high, the stop signal being generated by either the master or the slave; and a data handshaking sequence for setting the data line when the clock signal is low and reading the data line when the clock signal is raised after the data line is set.

The present invention may further comprise a communication protocol for communicating between at least one master and a plurality of slaves comprising: a neutral state, the neutral state being with a data line and a clock line high with an acknowledge line low; a start state generated by a transmitting device, the transmitting device being either a master or a slave, the start signal comprising pulling the data line down while the clock line is high; an address transmission by the transmitting device, the address being the address of a particular slave, the transmission comprising the handshaking of the clock line, the acknowledge line, and the data line, the transmission further comprising setting the data line when the clock signal is low, and further comprising raising the clock signal after the data line is set, and further comprising reading the data line after the clock signal is raised; the determination of a receiving device, the receiving device being the particular slave if the master is the transmitting device or the receiving device being the master if the transmitting device is the particular slave; a data transmission from the transmitting device to the receiving device; and a stop state generated by the transmitting device, the stop signal being such that the data line is allowed to change from low to high while the clock signal is high.

The present invention may further comprise a method of communication between a master and at least one slave comprising: connecting the master and the slaves with a clock line, an acknowledge line, and a data line, the clock line being able to be pulled low by the master, the acknowledge line being able to be pulled low by the slaves, and the data line being able to be pulled low by the master and the slaves; establishing a neutral state, the neutral state being the clock line being high, a data line being high, and an acknowledge line being low; initiating a communication by sending a start signal, the start signal being the lowering of the data line while the clock line is high, the start signal being sent by a transmitting device, the transmitting device being either the master or one of the slaves; transmitting an address, the address being the address of a particular slave, the transmission comprising the handshaking of the clock line, the acknowledge line, and the data line, the transmission further comprising setting the data line when the clock signal is low, and further comprising raising the clock signal after the data line is set, and further comprising reading the data line after the clock signal is raised; determining a receiving device, the receiving device being the particular slave if the master is the transmitting device or the receiving device being the master if the transmitting device is the particular slave; transmitting data from the transmitting device to the receiving device; and transmitting a stop signal by the transmitting device, the stop signal being such that the data line is allowed to change from low to high while the clock signal is high.

The advantages of the present invention are that either masters or slaves may initiate communication. Further, the speed of the bus is dependent only on the performance of the devices on the bus and may automatically vary depending on the conditions under which the protocol is employed. The protocol allows for the highest communication speed possible under the conditions.

DETAILED DESCRIPTION OF THE INVENTION

Figure 1:
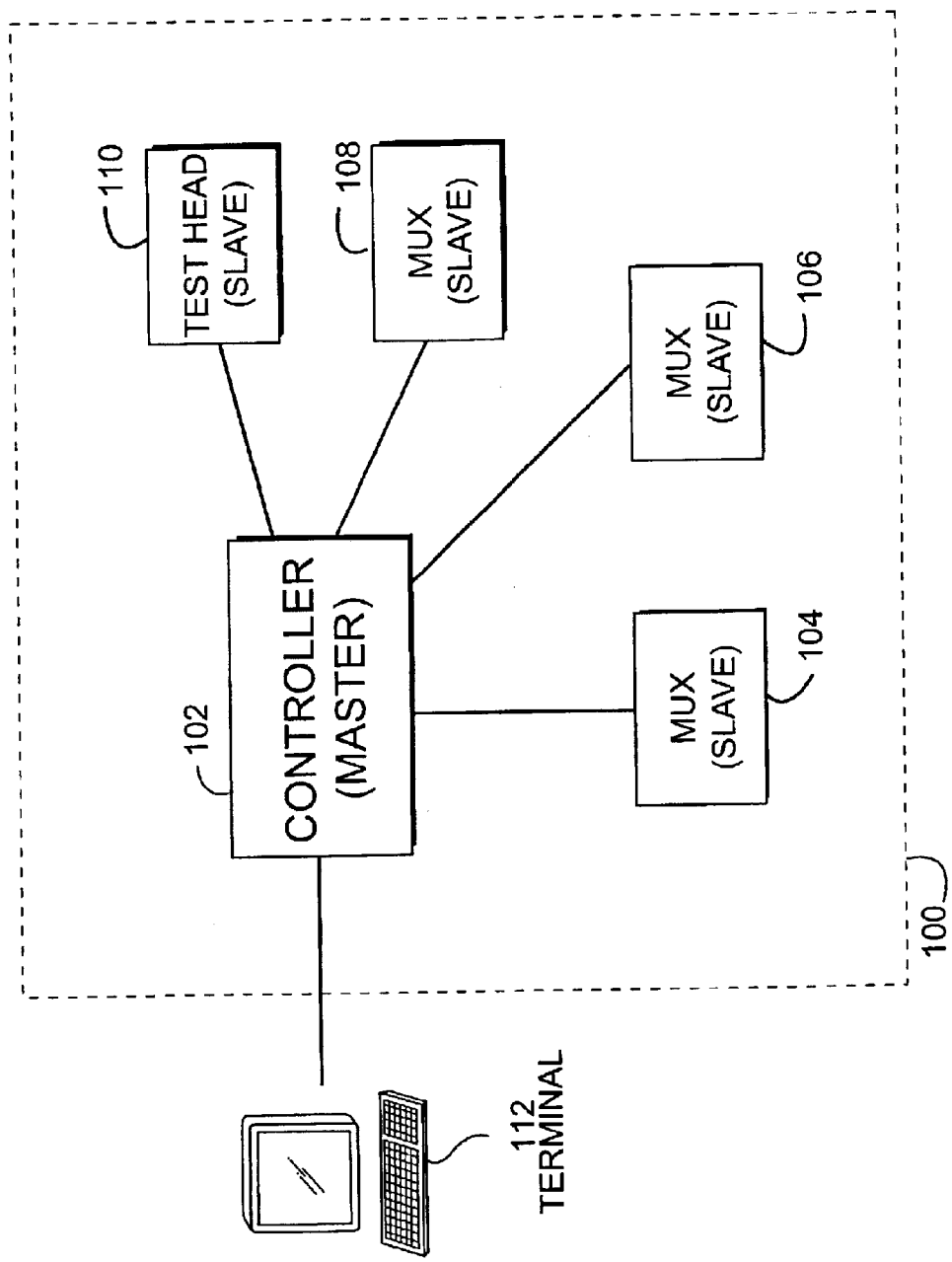
FIG. 1 is an illustration of an embodiment of a switch system wherein a controller communicates to several devices using the inventive three wire communication protocol.

FIG. 1 illustrates the construction of an embodiment of a switch system 100 wherein a controller 102 communicates to several multiplexers ('muxes') 104, 106, and 108 as well as a test head 110. The controller 102 is also in communication with a terminal 112. The function of the controller 102 is to receive commands from a terminal 112 and perform various functions, such as configure the switches in the muxes 104, 106, and 108, perform a test using the test head 110, or other functions as may be desired.

In the present embodiment, the controller 102 is configured as a master, and the other devices such as the muxes 104, 106, and 108 and the test head 110 are configured as slaves. These devices are connected using a three wire serial bus.

Figure 2A:
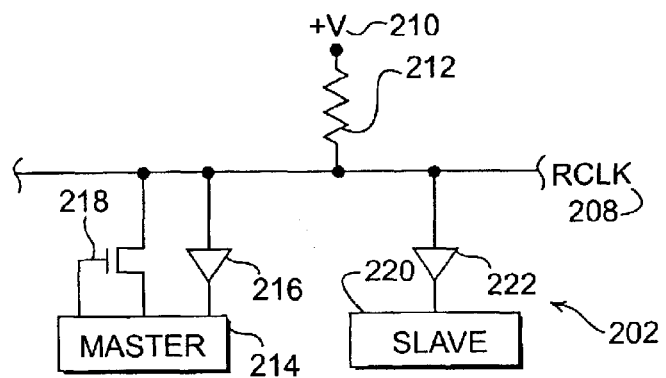
FIG. 2 is an illustration of an embodiment of the present invention of the connections of the three wire serial bus between the master and the slaves.
Figure 2B:
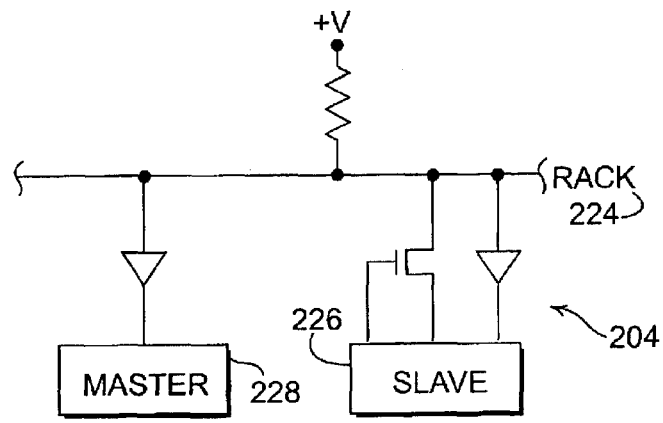
Figure 2C:
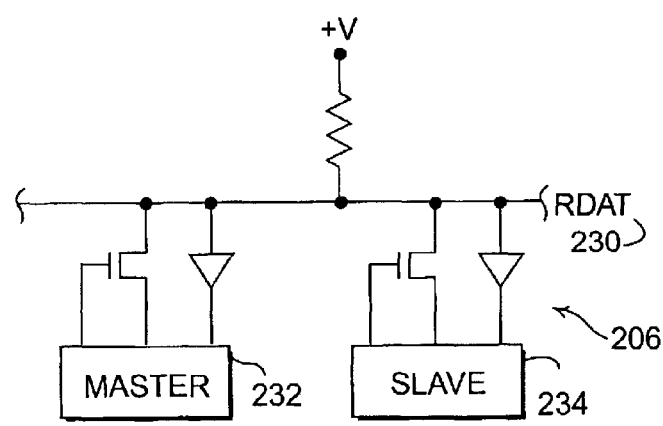

FIGS. 2A, 2B, and 2C illustrate an embodiment of the connections of the three wire serial bus between the master and the slaves. The circuit 202 illustrates a partial schematic of the connections for the RCLK line. Circuits 204 and 206 similarly illustrate the connections for the RACK and RDAT lines.

The RCLK line 208 of circuit 202 is connected to a voltage source 210 through a current limiting resistor 212. The master 214 is connected to the RCLK line 208 through an amplifier 216 and a pull down transistor 218. The slave 220 is connected to the RCLK line 208 through an amplifier 222 only. In the normal idle state, RCLK 208 is high and can be pulled low only by the master 214. The slave 220 may only monitor RCLK 208 through the amplifier 222.

The RACK line 224 is similarly configured as RCLK 208, except that the slave 226 is able to pull RACK 224 low and the master 228 is not able to do so.

The RDAT line 230 is similarly configured as RCLK 208 and RACK 224, except that both the master 232 and slave 234 are able to pull RDAT 230 low.

The embodiment of the present invention allows several devices to communicate with each other. Data transfer may occur in any direction, that is, from the master to the slave, or from the slave to the master.

Figure 3:
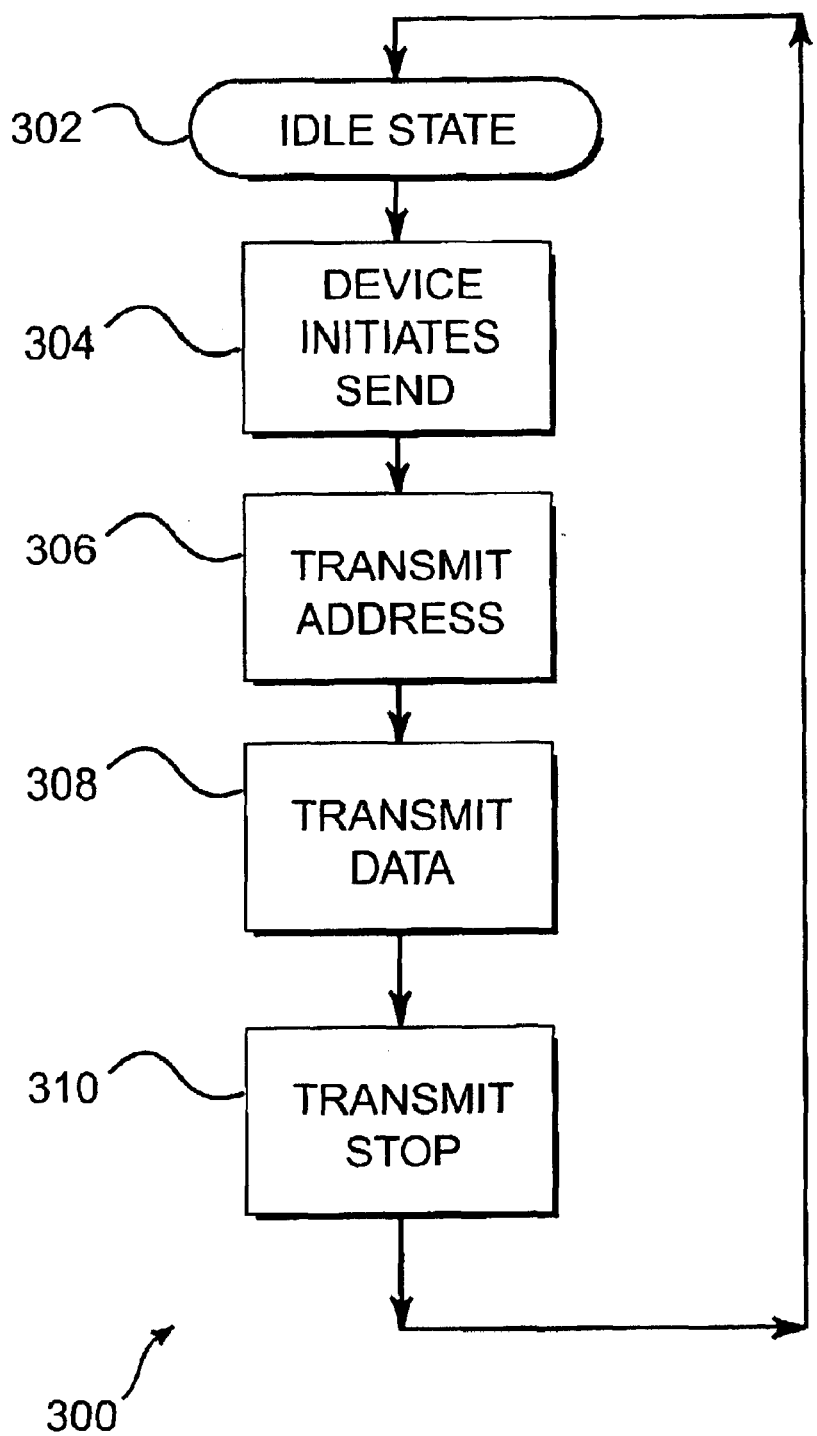
FIG. 3 is an illustration of an embodiment of the present invention of the basic communication sequence for any device to communicate to another device.

FIG. 3 illustrates the basic communication sequence 300 for any device to communicate. All devices begin in an idle state 302. The device initiates the sending of data 304, transmits an address 306, transmits data 308, transmits a stop signal 310, and returns to the idle state 302.

The idle state 302 exists when at least a master and a slave are connected on the bus. In the neutral or disconnected state, all three lines, RCLK, RACK, and RDAT are high. When a slave is attached, the neutral state is to pull the RACK line low, indicating the presence of at least one slave device. As several slave devices are attached to the bus, each one will pull the RACK line low when it is turned on and functioning.

The device initiates sending of data 304 by sending a start command. The start command is to bring the RDAT line low while in the idle condition. This signals to all devices that a transmission is about to begin.

The device sends an address 306. If the communication is originating at the master, the address indicates the address of a slave that is supposed to receive the data. If the communication is originating at a slave, the address indicates the address of the slave that is transmitting the data. All of the devices on the bus must receive and analyze the address. If the device is not being addressed, that device does not necessarily participate in receiving the data from the source and can wait for the stop signal 310. In this manner, only the devices that are communicating are necessary to participate in the communication handshaking, allowing the other devices to do other tasks, and allowing the transfer of data to happen at the fastest speed possible.

The device sends data 308. The data are whatever information needs to be sent. For example using the embodiment illustrated in FIG. 1, the master controller 102 may send a command to mux 104 to set a certain set of switches in a certain position.

When the data are completed, a stop signal is sent 310. The stop signals indicates to all of the devices that the transmission has completed and that they are to enter the idle state described above.

Figure 4:
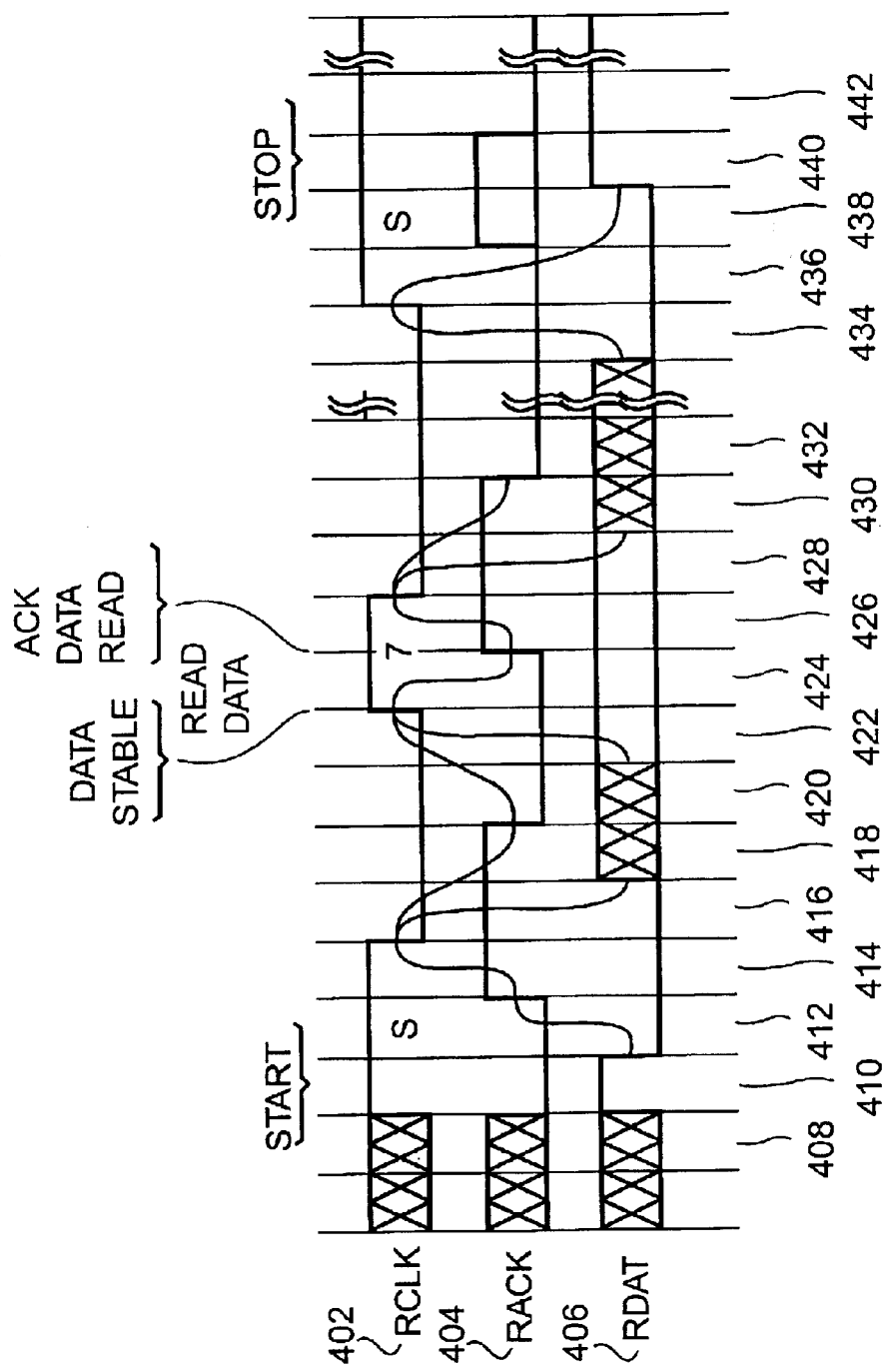
FIG. 4 is an illustration of an embodiment of the present invention of the handshaking of the various lines during a transmission.

FIG. 4 illustrates the handshaking of the various lines during a transmission. RCLK 402, RACK 404, and RDAT 406 are shown on the left hand side of the timing diagram.

Time slot 410 represents the idle state, wherein RCLK 402 and RDAT 406 are high and RACK 404 is low. This state occurs when at least one slave device is connected on the bus, since slaves and not masters are able to bring the RACK 404 low.

Time slot 412 represents the initiation of the send sequence. While the RCLK 402 is high, RDAT 406 is brought low. Any device, master or slave, may initiate the send command.

In time slot 414, each slave recognizes the send command and must release the RACK 404 line. Since every slave connected to the bus had pulled down the RACK 404 line, the last slave to release the RACK 404 line will indicate that every slave has acknowledged the send command.

The time delay between the initiation of the send sequence and the last slave releasing the RACK 404 line is the approximate time delay necessary for each step of the address sequence. In other words, the general response time for the entire system of master and slaves to communicate may be estimated by measuring the time delay between steps 410 and 414. This time delay may be used to ensure proper transmission of data, as discussed below.

In time slot 416, the master has received the acknowledgement of all of the slaves to the send command and therefore brings the RCLK 402 line low. The indication that the RCLK 402 is low is also an indication that the data line may be set for data.

During time slots 418 the data may be set by whichever device initiated the data send sequence. In time slot 420, the RACK 404 line is pulled low by all of the slaves.

A time delay occurs in time slot 422, allowing all of the slaves to get a chance to pull RACK 404 low. This time delay is approximately equal to at least the time delay between time slots 410 and 414. In many applications, it may be preferable to set the time delay of time slot 422 to be a predetermined time. In other applications, the master may count the time delay between time slots 410 and 414 and set the time delay of time slot 422 to be the counted time delay plus an additional factor.

In time slot 422, the master releases the RCLK 402 line after a delay. The release of the RCLK 402 line indicates that the data is presumed stable and the data is safe to read.

After reading the data, each of the slaves releases the RACK 404 line, indicating that each slave has received the data. Once the data is read by all of the slaves, the master pulls the RCLK 402 low at the end of time slot 426 and the sequence repeats for another bit.

During the normal handshaking and data transfer, RDAT 406 may not be changed during the period that RCLK 402 is high. RDAT 406 is only adjusted when the RCLK 402 line is low. The only exception is the start and stop commands. The start sequence is initiated when RCLK 402 is high, RACK 404 is low, and RDAT 406 is moved from high to low. This is illustrated in time slots 410 and 412.

The stop command is illustrated in time slots 434 through 440. The last bit at the end of a transmission is a zero, leaving the RDAT 406 low. After the RCLK 402 line is released by the master, the device transmitting the data releases RDAT 406, indicating that the transmission is complete.

The communication protocol described herein is designed for the communication between many devices, at least one being a master and at least one being a slave. In general, there may be one master and a plurality of slaves. The number of devices is only limited by the addressing scheme. The communication only occurs between two devices at the same time, one of them always being the master. For example, any one of the slaves may initiate communication to the master, and the master may initiate communication to any of the slaves.

The communication protocol begins with the transmission of an address followed by the data. If the slave initiates the communication, the slave transmits its own address to the master. If the master initiates the communication, the master transmits the address of the slave for which the communication is intended. All of the devices must participate during the address portion of the communication. However, only the master and the slave to which it is communicating need participate in the data sequence. During the data sequence, the speed of the handshaking may be quicker, since not as many devices need to handshake the RACK 404 line. The non-participating slaves may ignore the transmission until the stop sequence is sent, at which time all of the slaves must begin monitoring the idle status of the lines until a send sequence is initiated.

During the data sequence, the time delay illustrated in time slot 422 may be adjusted to speed up the transmission. In some cases, the master may be able to dynamically measure the response time of the handshaking and change the delay illustrated of time slot 422 for the data transmittal portion of the communication.

Figure 5:
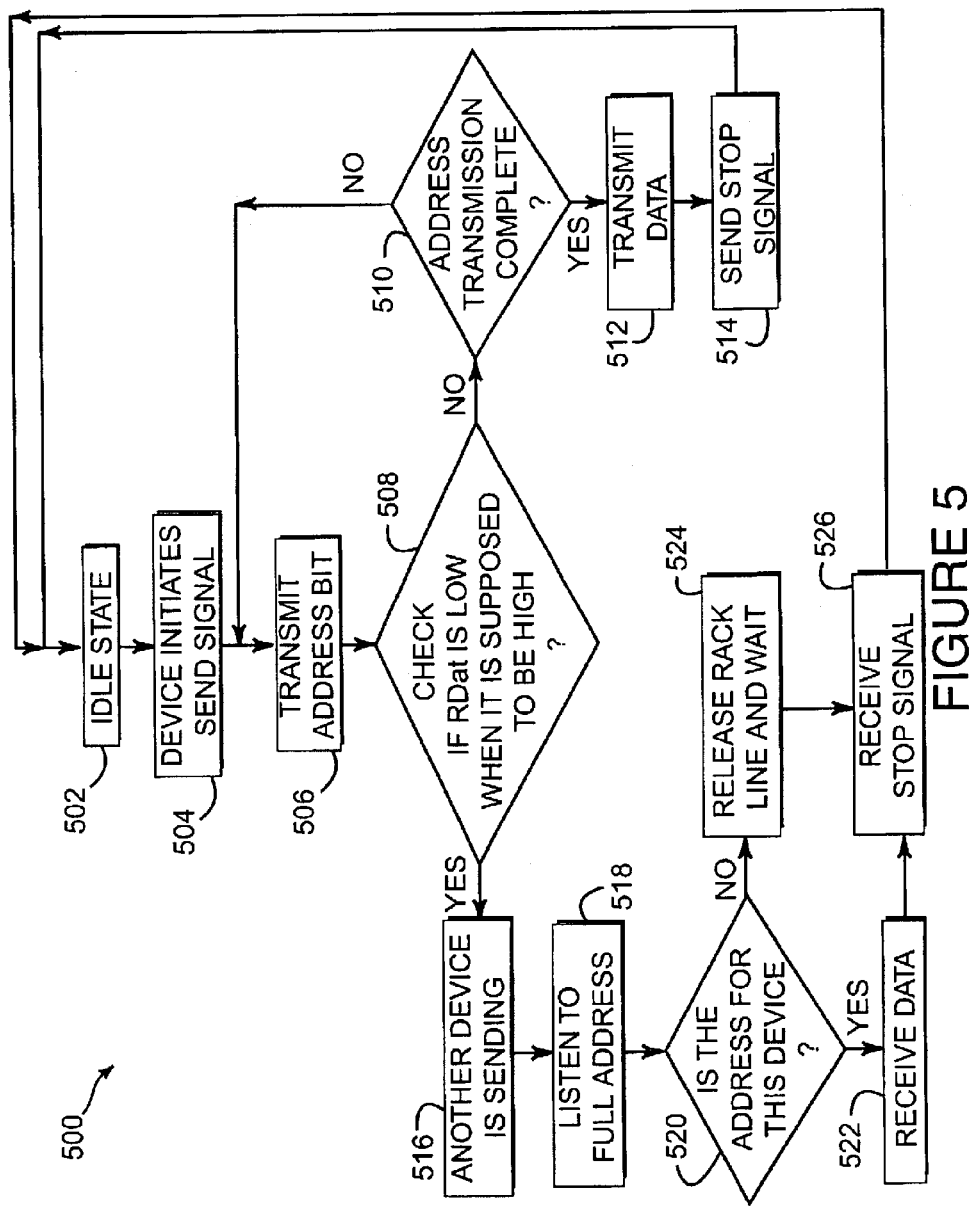
FIG. 5 is an illustration of an embodiment of the present invention of a flow diagram of the decision making process used to arbitrate when devices are using the communication bus at the same time.

FIG. 5 illustrates a flow diagram of an embodiment 500 of the decision making process used to arbitrate when devices are using the communication bus at the same time. The idle state 502 is the condition where all the devices are connected to the bus but no communication is occurring. A device initiates a send signal 504 by pulling down the RDAT line in the idle state. An address bit is transmitted 506. The device that is transmitting the bit checks that RDAT is going low if it is supposed to do so in block 508. If RDAT is operating as it should, and the address is not complete in block 510, the next address bit is transmitted. If the address is complete, the device transmits data 512, sends a stop signal 514, and returns to the idle state 502.

If two or more devices initiate the send signal 504 at the same time, and both begin transmitting address bits 506, one device must be given priority. A method for determining priority is to check that RDAT is pulled low when RDAT is supposed to be high in block 508. If another device is trying to send an address at the same time, and the other device's address contains a zero instead of a one for the particular bit, the other device has a lower address number than the present device. The lower number device, therefore, can be given priority, and only the higher numbered device is capable of detecting the state of conflict.

If the conflict is detected, by virtue of wishing to assert a one when another device pulls the RDAT to zero, the higher numbered device determines that another device is sending 516. At this point, the device will listen to the full address 518 of the transmitting device to determine if the address is for the present device 520. If the address is the present device, meaning that the master and slave are both trying to communicate at the same time, the slave will receive the data 522 and then the stop signal 526. If the transmission is not for the present device, then the present device may release the RACK line 524 and wait for the stop signal 526, since the present device is not needed for the data transmission handshaking.

The ability for conflicting devices to prioritize themselves is inherent in the addressing scheme. Because RDAT is asserted by pulling low, the lower numbered devices will have priority. Care in the selection of the addresses of the various devices will ensure the priority of the transmissions. For example, the slave device with an eight bit address of 00000000 will always receive first priority, and thus the address 00000000 may be assigned to the most important slave.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A communications protocol for the communication of data between at least one master and at least one slave comprising:

a data line, said data line being in communication between said master and said slave, said data line being adapted to be in a normally high state and further being adapted to be pulled low by either said master or said slave;

a clock line, said clock line being in communication between said master and said slave, said clock line being adapted to be in a normally high state and further being adapted to be pulled low by said master;

an acknowledge line, said acknowledge line being in communication between said master and said slave, said acknowledge line being adapted to be in a normally high state and further being adapted to be pulled low by said slave;

a neutral state, said neutral state being such that said data line and said clock line are high and said acknowledge line is low;

a start signal, said start signal being such that said data line is pulled low while said clock line is high, said start signal being performed by either said master or said slave;

a stop signal, said stop signal being such that said data line is allowed to change from low to high while said clock line is high, said stop line being performed by either said master or said slave; and a data handshaking sequence, said sequence being such that said data line may be set when said clock line is low, said sequence further being such that said clock line is raised high after said data line is set, said sequence being such that said data line is read after said clock line is raised.

2. A communication protocol between at least one master and a plurality of slaves comprising:

a neutral state, said neutral state being with a data line and a clock line high with an acknowledge line low;

a start state generated by a transmitting device, said transmitting device being either a master or a slave, said start state comprising pulling said data line down while said clock line is high;

an address transmission by said transmitting device, said address being the address of a particular slave, said transmission comprising the handshaking of said clock line, said acknowledge line, and said data line, said transmission further comprising setting said data line when said clock line is low, and further comprising raising said clock line high after said data line is set, and further comprising reading said data line after said clock line is raised;

the determination of a receiving device, said receiving device being said particular slave if said master is said transmitting device or said receiving device being said master if said transmitting device is said particular slave;

a data transmission from said transmitting device to said receiving device; and a stop state generated by said transmitting device, said stop state being such that said data line is allowed to change from low to high while said clock line is high.

3. A method of communication between a master and at least one slave comprising:

connecting said master and said slaves with a clock line, an acknowledge line, and a data line, said clock line being able to be pulled low by said master, said acknowledge line being able to be pulled low by said slaves, and said data line being able to be pulled low by said master and said slaves;

establishing a neutral state, said neutral state being said clock line being high, a data line being high, and an acknowledge line being low;

initiating a communication by sending a start signal, said start signal being the lowering of said data line while said clock line is high, said start signal being sent by a transmitting device, said transmitting device being either said master or one of said slaves;

transmitting an address, said address being the address of a particular slave, said transmission comprising the handshaking of said clock line, said acknowledge line, and said data line, said transmission further comprising setting said data line when said clock line is low, and further comprising raising said clock line high after said data line is set, and further comprising reading said data line after said clock line is raised;

determining a receiving device, said receiving device being said particular slave if said master is said transmitting device or said receiving device being said master if said transmitting device is said particular slave;

transmitting data from said transmitting device to said receiving device; and transmitting a stop signal by said transmitting device, said stop signal being such that said data line is allowed to change from low to high while said clock line is high.

* * * * *